(12) United States Patent
Becnel

(10) Patent No.: US 9,932,116 B1
(45) Date of Patent: Apr. 3, 2018

(54) UNIVERSAL WATER ACTIVATED RELEASE SYSTEM

(71) Applicant: Steven A. Becnel, Belle Chasse, LA (US)

(72) Inventor: Steven A. Becnel, Belle Chasse, LA (US)

( * ) Notice: Subject to any disclaimer, the term of this patent is extended or adjusted under 35 U.S.C. 154(b) by 655 days.

(21) Appl. No.: 14/135,744

(22) Filed: Dec. 20, 2013

Related U.S. Application Data

(60) Provisional application No. 61/740,237, filed on Dec. 20, 2012.

(51) Int. Cl.
*B64D 17/38* (2006.01)
*B64D 17/32* (2006.01)

(52) U.S. Cl.
CPC .................................. *B64D 17/32* (2013.01)

(58) Field of Classification Search
CPC ........... B64D 17/38; B64D 1/08; B64D 17/00
USPC ............................................. 244/151 A, 152
See application file for complete search history.

(56) References Cited

U.S. PATENT DOCUMENTS

| | | | | |
|---|---|---|---|---|
| 3,617,019 A * | 11/1971 | Femia | ................... | B64D 17/32 24/313 |
| 3,632,066 A * | 1/1972 | Brown | ................... | B64D 17/38 244/151 A |
| 3,865,333 A * | 2/1975 | Fielding | ................ | B64D 17/38 244/137.3 |
| 4,050,122 A * | 9/1977 | Turner | .................. | B64D 17/38 24/603 |
| 4,253,628 A * | 3/1981 | Marek | ................... | B64D 17/22 244/151 A |
| 4,644,616 A * | 2/1987 | Ferry | .................... | B60R 22/321 200/61.58 B |
| 5,857,246 A * | 1/1999 | Becnel | ................. | B60R 22/321 24/602 |
| 7,040,580 B1 * | 5/2006 | Cloth | .................... | B64D 17/56 244/149 |

* cited by examiner

*Primary Examiner* — Brian M O'Hara
*Assistant Examiner* — Keith L Dixon
(74) *Attorney, Agent, or Firm* — Banner & Witcoff, Ltd.

(57) ABSTRACT

A fluid activated parachute release apparatus includes a liquid sensor component moveably coupled to a cam member including a cavity; a disk configured to engage the cavity of the cam member; and a fork member releasable from the disk responsive to rotation of the cam member.

5 Claims, 8 Drawing Sheets

UNIVERSAL WATER ACTIVATED RELEASE SYSTEM

CROSS REFERENCE TO RELATED APPLICATION

The present application claims priority to U.S. Provisional Application 61/740,237, filed Dec. 20, 2012, the disclosure of which is incorporated herein by reference.

FIELD

The present invention generally relates to parachutes, and in particular to a fluid activated automatic release device capable of opening and detaching a parachute harness from a pilot's vest.

BACKGROUND OF THE INVENTION

Parachutes save lives. On occasions, however, a person might be an accident such that the individual is rendered unconscious and unable to initiate release of parachute upon landing in a body of water. There is a critical need for a reliable system for a parachute release when submerged under water.

BRIEF SUMMARY

Aspects of the present invention pertain to a fluid activated automatic release apparatus for releasing a capable of opening and detaching the parachute harness from pilot's vest upon submerging in water and/or activating various mechanical release mechanisms.

According to one aspect, there is provided a parachute release apparatus including a liquid sensor component moveably coupled to a cam member including a cavity; a disk configured to engage the cavity of the cam member; and a fork member releasable from the disk responsive to rotation of the cam member.

According to one aspect, there is provided a parachute release apparatus including a liquid sensor component moveably coupled to a cam member having a wall defining two cavities and at least one disk movable on the wall and a fork member having a portion engagable with the at least one disk.

According to another aspect, there is provided a parachute release apparatus including a linear actuator configured to moveably engage a cam member responsive to a liquid being sensed by the liquid sensor component.

BRIEF DESCRIPTION OF THE DRAWINGS

The foregoing summary of the invention as well as the following detailed description of the invention, considered in conjunction with the accompanying drawings, provides a better understanding of the invention, in which like reference numbers refer to like elements, and wherein.

DETAILED DESCRIPTION

Figure 1:
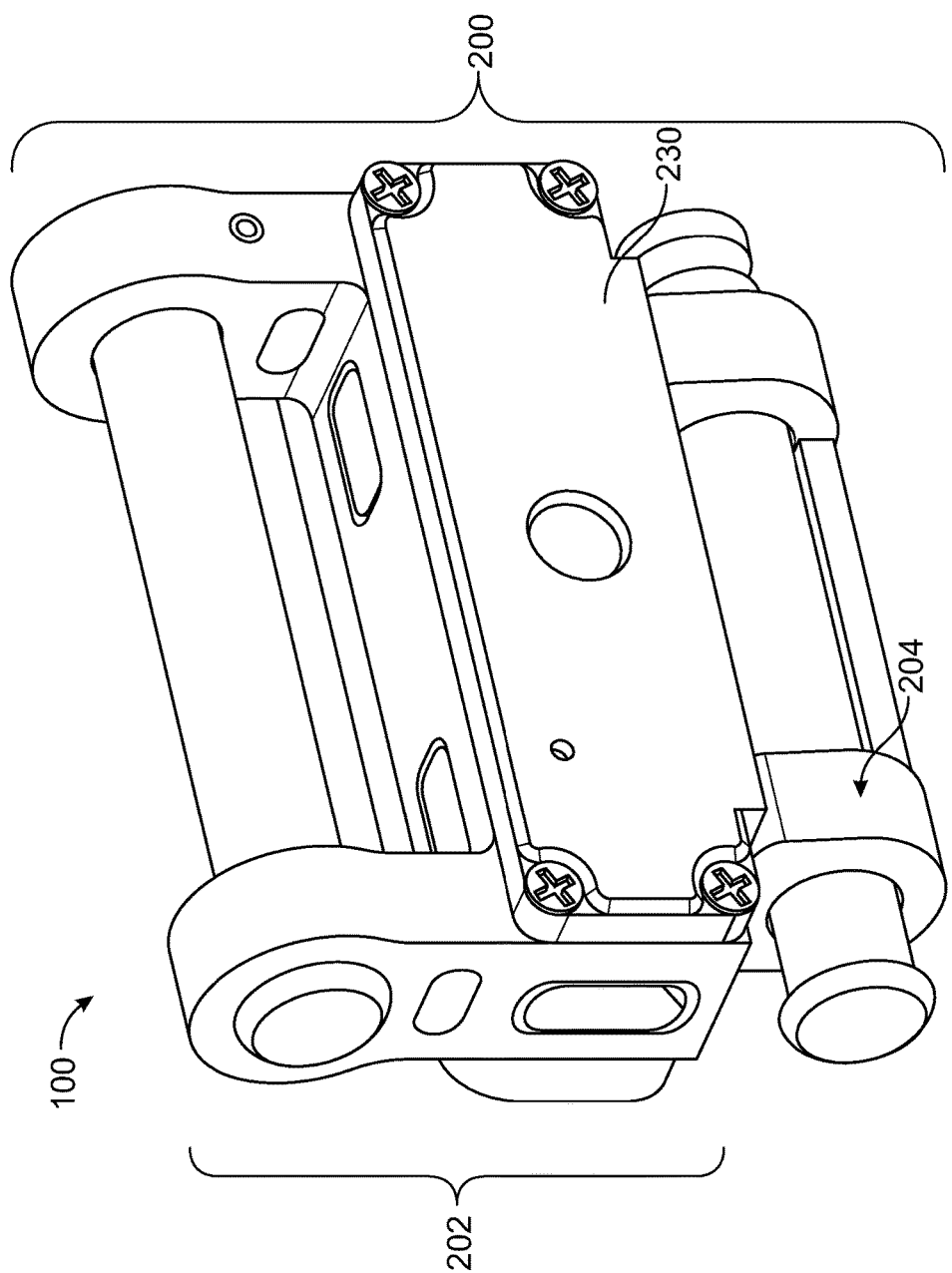
FIG. 1 is a perspective view an system according to an embodiment of the invention.
Figure 2:
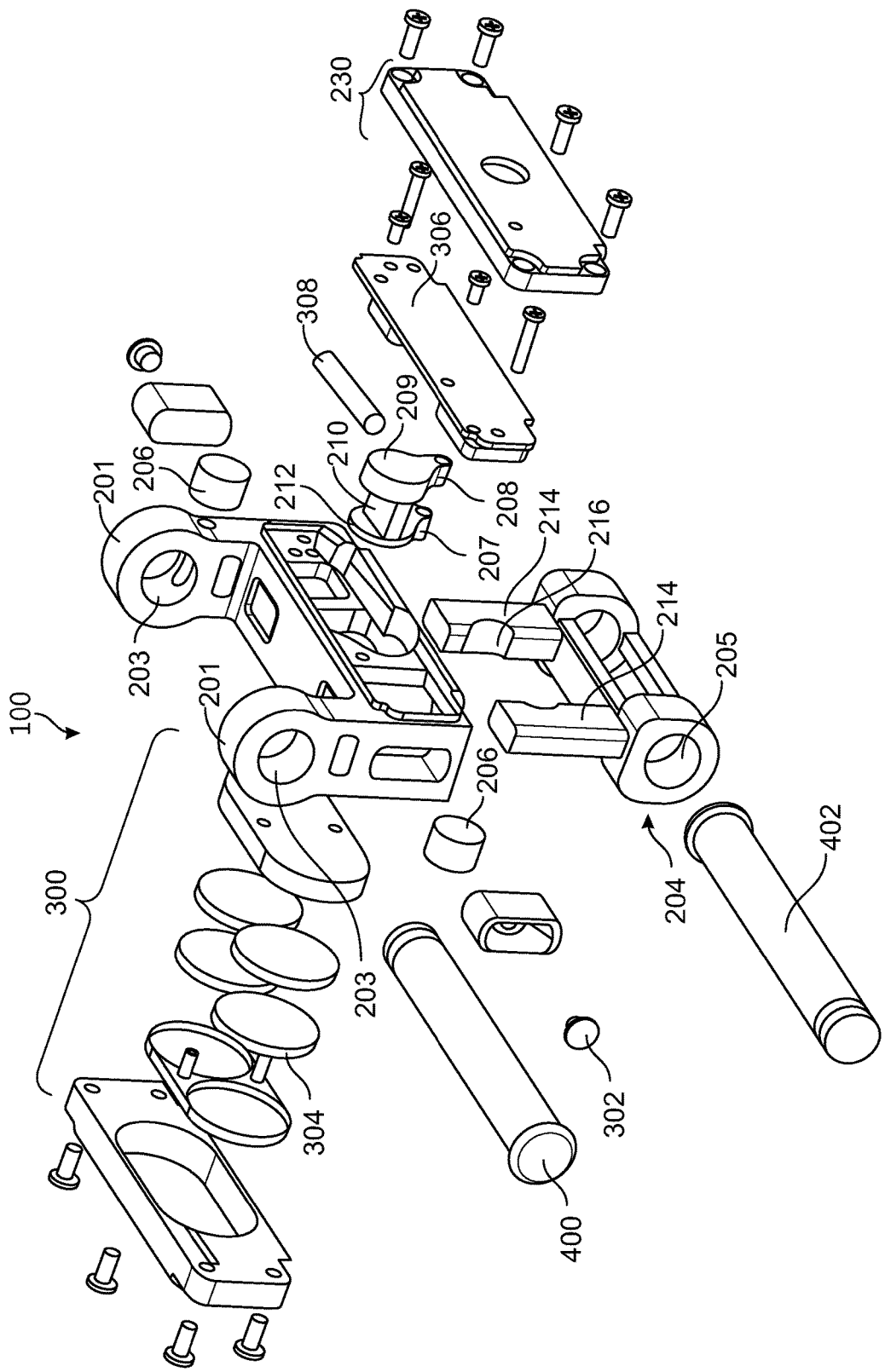
FIG. 2 is an exploded assembly view of the system of FIG. 1.
Figure 3:
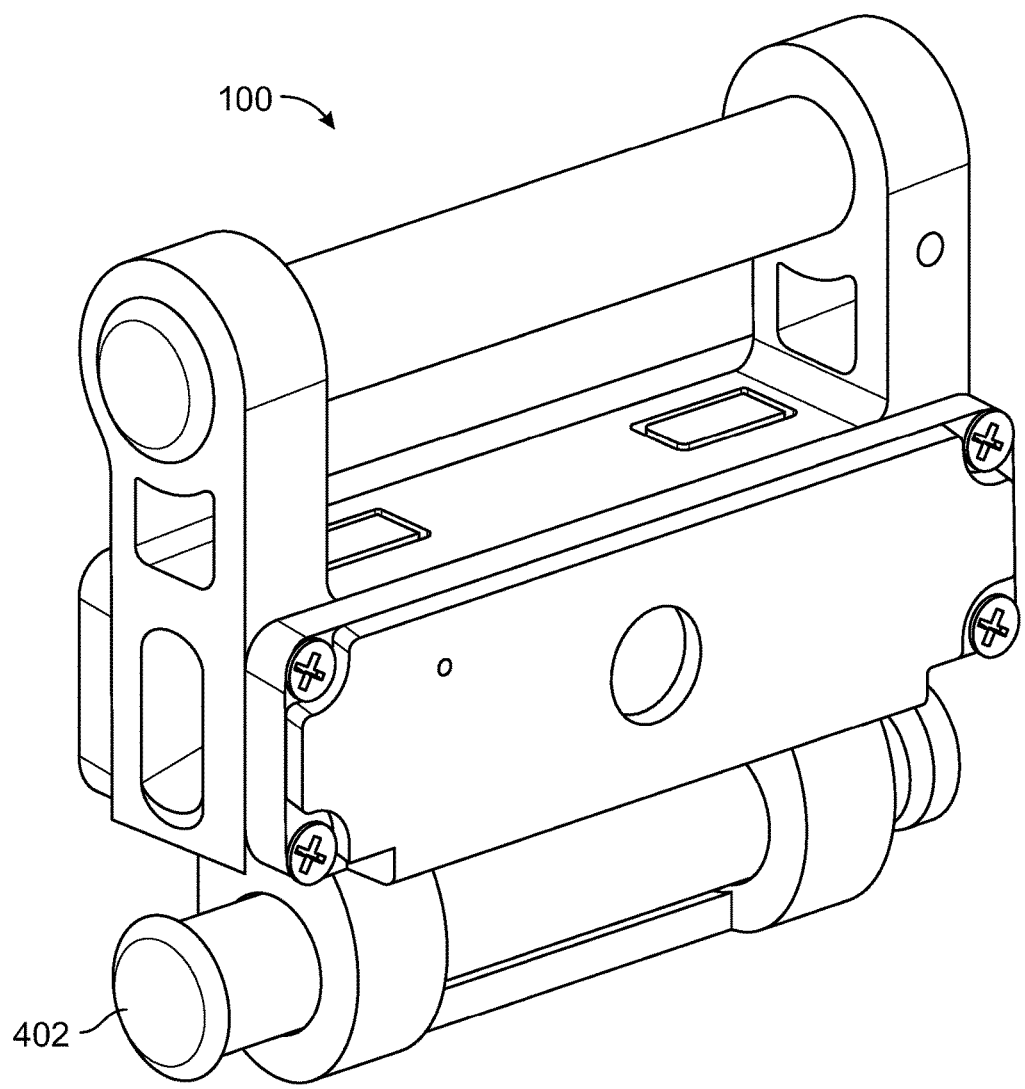
FIG. 3 is a perspective of the system according to an embodiment of the invention.
Figure 4:
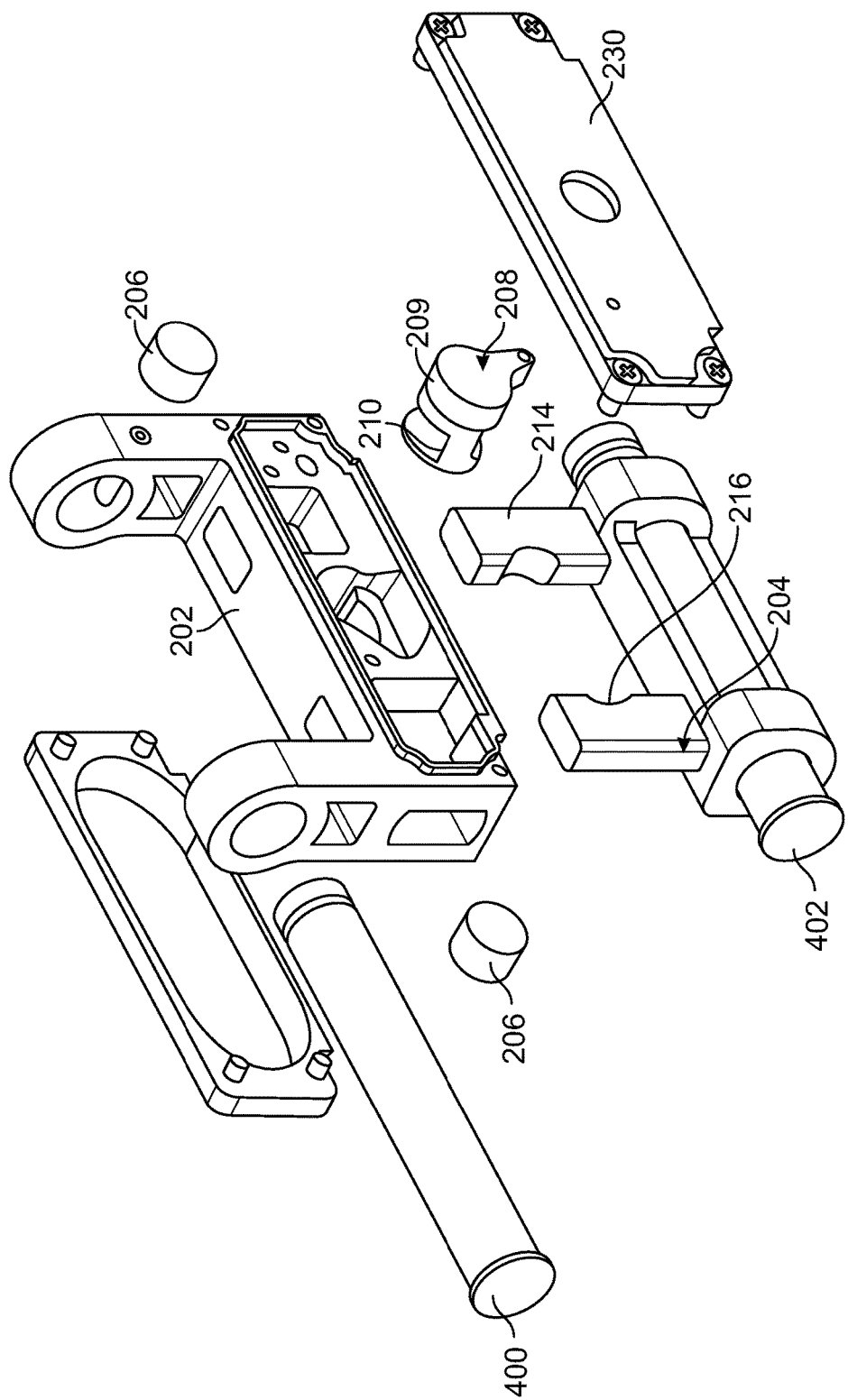
FIG. 4 is a simplified exploded view of mechanical components of the system.
Figure 5:
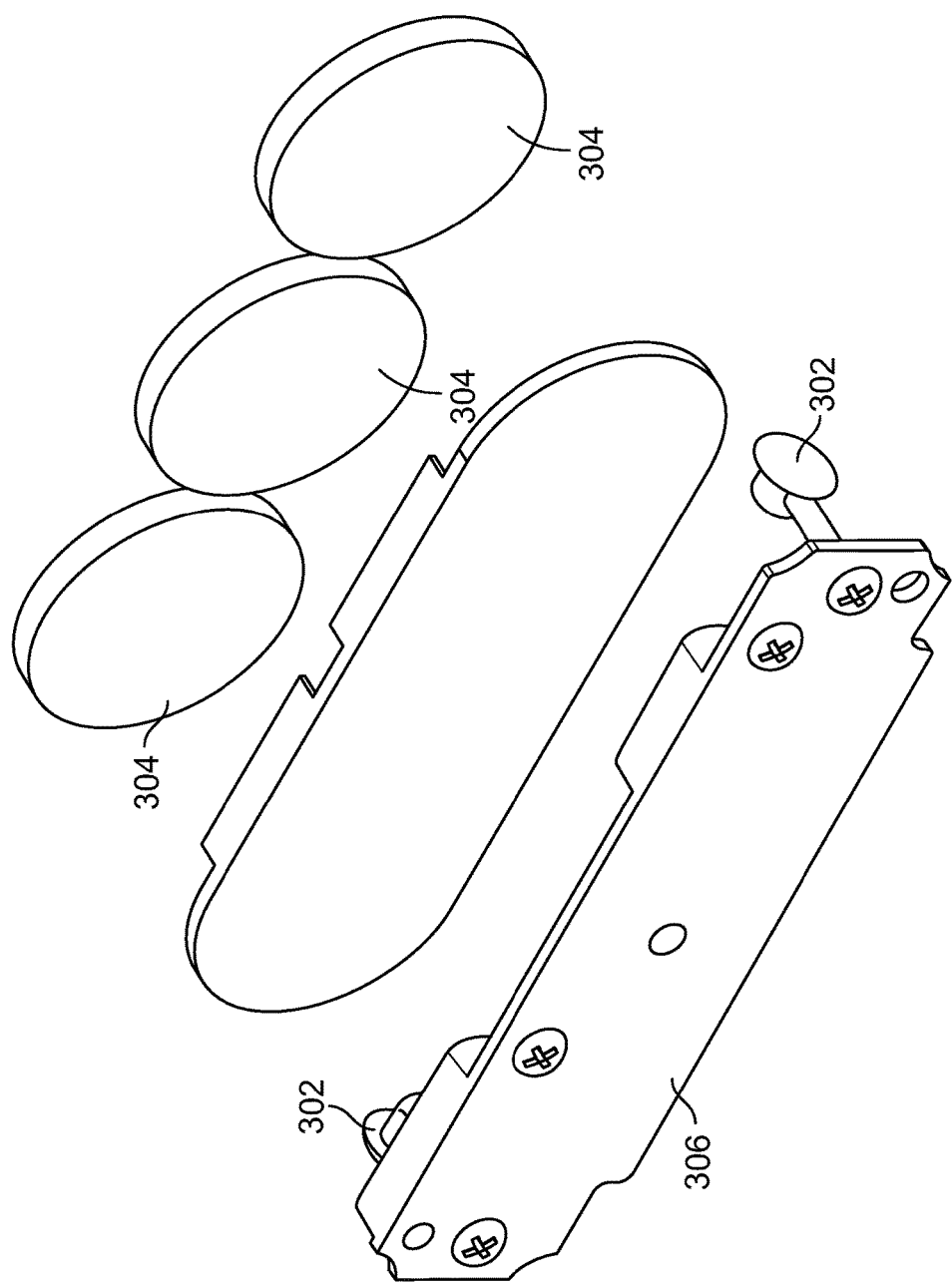
FIG. 5 is an exploded view of the various components of an electric module according to an embodiment of the invention.

FIGS. 1-8 illustrate an embodiment of a Universal Water Activated Release System 100 ("system"). Aspects of the system 100 pertain to a fluid activated automatic release apparatus for releasing a capable of opening and detaching the parachute harness from pilot's vest upon submerging in water and/or activating various mechanical release mechanisms. The system 100 when attached to the harness of a parachute is configured to open itself automatically and release the parachute harness when the wearer falls into a body of water (e.g., lake, river, ocean) and the system 100 is totally submerged in the body of water.

To provide a better understanding of the system 100, one construction is described in more detail below. The system 100 is broadly constructed of a mechanical housing 200 and an electronic module 300 built into the main housing 200 for performing various functions. In one construction, the electronic module 300 comprises two sensor caps 302, a power source 304 (e.g. three to four 3 volt batteries), an electronic circuit board 306, linear actuator 308 and built into the main housing an electromagnetic radiation (EMI) extrusion.

In one construction, the mechanical housing 200 comprises a main mechanical body 202, a fork body 204 which separates/releases from the mechanical body 202, two disks 206 which engage with a rotatable cam 208. The release is used to automatically detach a parachute harness from a pilot's vest. The main mechanical body 202 includes an interior portion which includes cavities housing components, such as the disks 206, cam 208, and linear actuator 308 for example. A cover assembly 230 is provided to enclose the components. The main body 202 includes two laterally disposed upright hook portions 201 with circular apertures 203 adapted to receive a shaft 400 therein. The shaft 400 may attach to the parachute harness or a vest of the wearer.

The fork body 204 includes two upright portions 214 each with a concave portion 216 adapted to matingly engage the each of the disks 206, respectively. The lower part of the fork body 204 include a housing with opposing circular apertures 205 adapted to receive a shaft 402 therein. The shaft 402 may attach to the parachute harness or a vest of the wearer.

The cam 208 is a unitary item of an outer member 209, a wall 210 and circular end 212. The cam 208 includes the outer member 209 having teardrop-like peripheral surface which abuttally engages the linear actuator 308. The interior of the cam 208 includes the wall 210 forming a cavity portion 211 on each side. The wall 210 ends may have bull nose end to engage disks 206. The circular end 212 is affixed to the wall 210.

Figure 6:
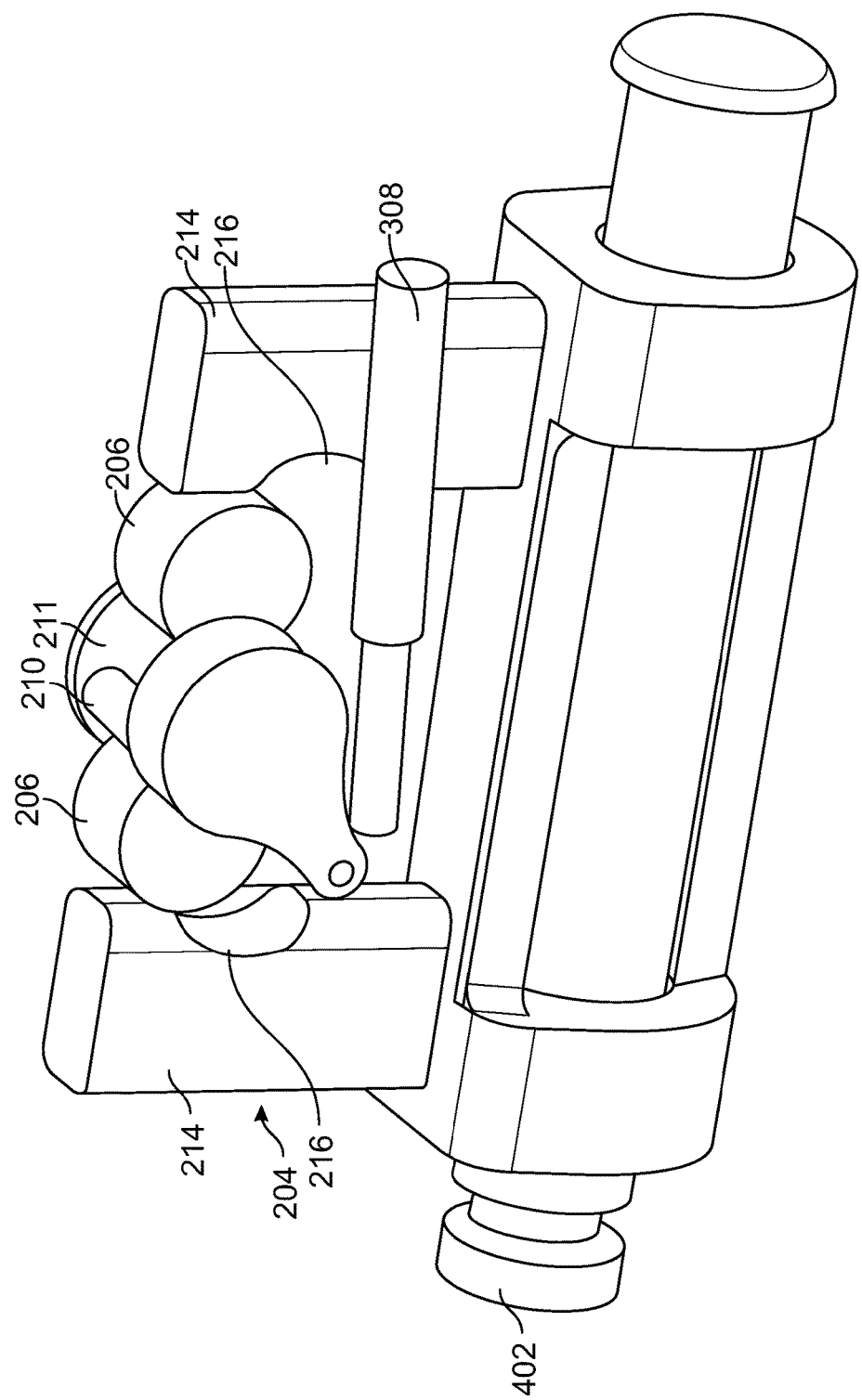
FIG. 6 is an enlarged schematic diagram showing an operation of the system showing cam, disk, linear actuator, and fork constructions.
Figure 7:
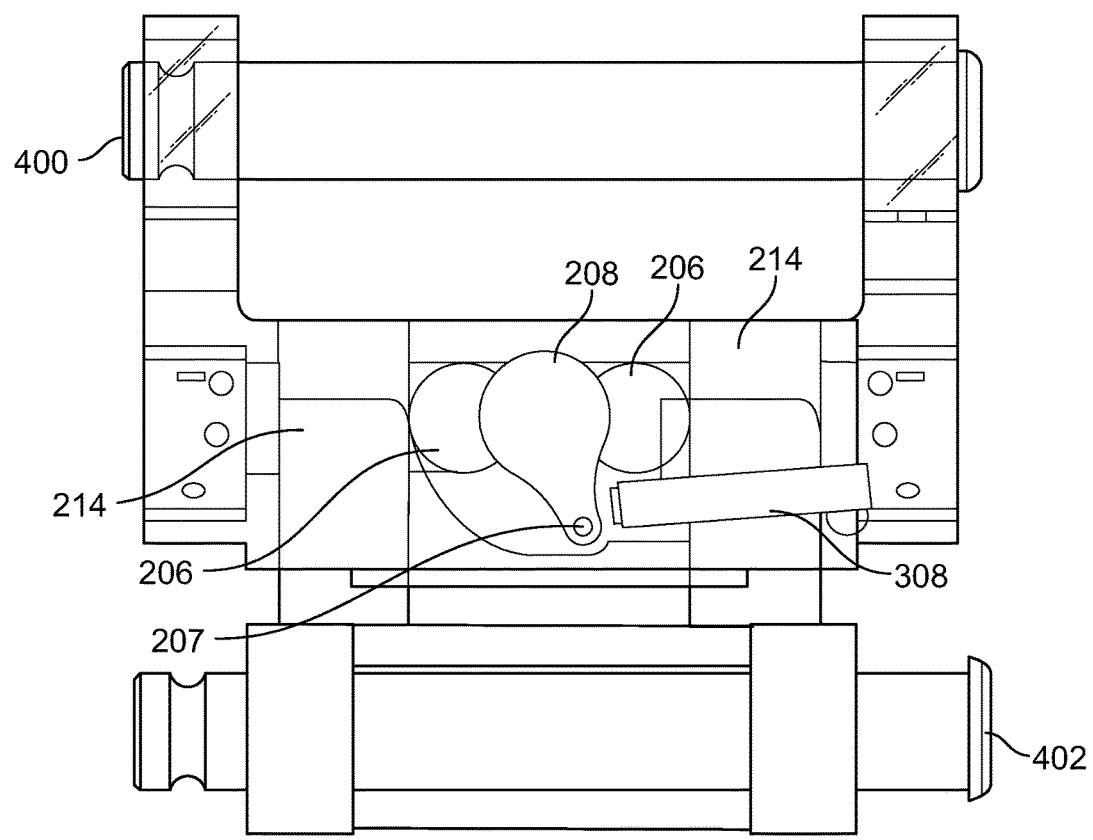
FIG. 7 is a schematic diagram showing an operation of the system release mechanism in an equilibrium position with internal features with top in phantom.
Figure 8:
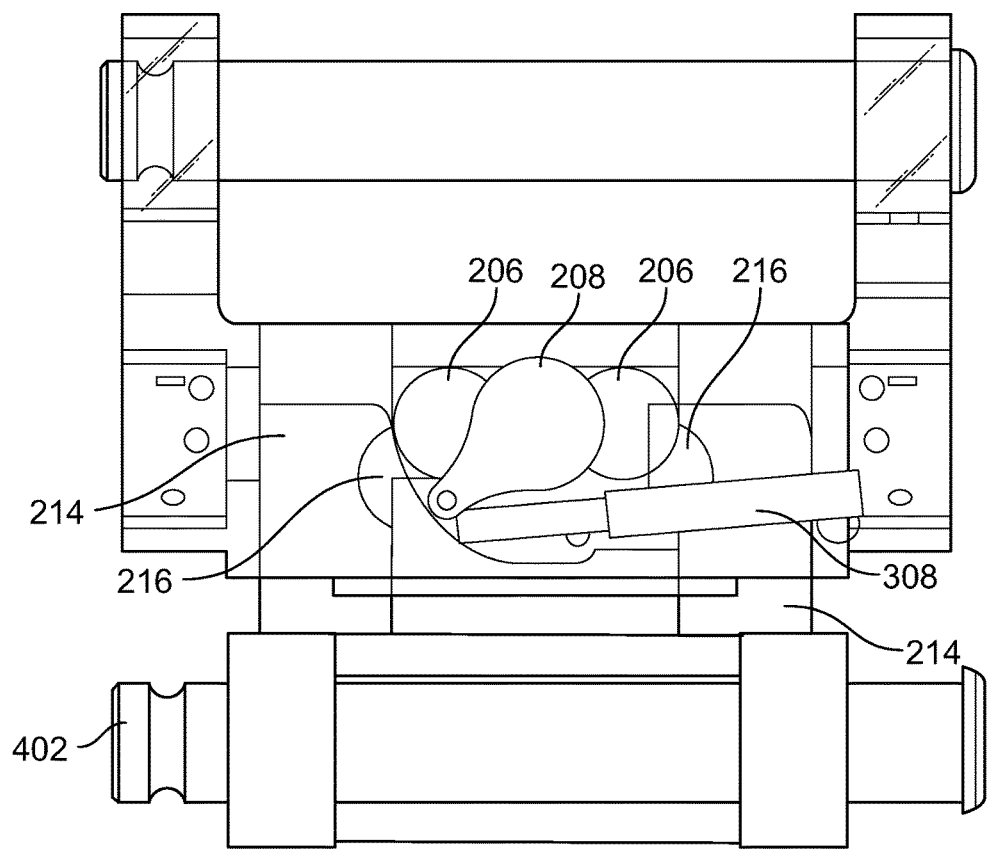
FIG. 8 is a schematic diagram showing an operation of the system release mechanism in a releasing position with internal features with top in phantom.

In one operation, when the system 100 is submerged in a salt water body, the salt water completes the circuit between the liquid sensors which are attached to the main circuit board 306. Completion of the circuit triggers a firing circuit that fires the linear actuator 308 with a discharge from a capacitor. A locking screw 207 prevents the cam 208 from rotation. Referring to FIGS. 7-8, firing of the linear actuator 306 produces a shearing force on the locking screw 207. The locking screw separates from the shearing force. Referring to FIG. 6, as the locking screw 207 is out of the way, cam 208 rotates clockwise and the disks 206 move toward the center of the fork 204 and simultaneously out of the concave portions 214. In this manner, the fork 204 moves in the direction out of the main body so open away from the body due to the applied force or the force of gravity.

Referring to FIG. 7, in the equilibrium position, wall 210 of the cam is parallel to the floor of the mechanical housing and locked by the shear screw. In this position, the cam 208 is pushes and keeps the disks in the concave portion of the fork 204 in the furthest possible position from the center of fork and. In this position disks 206 lock the fork 204 to prevent the fork from separating from the main body (e.g., system 100 does not release).

Referring to FIGS. 6 and 8, the opening or release of the fork 204 will occur when the cam is rotated at an angle sufficient to lower the friction between the sides of the flat part of the cam 208 and the disks. At this point the system 100 will open under the applied load or the force of gravity.

After an automatic release, the cam 208 does not return to its initial position of equilibrium but can be manually reset and locked with another locking shear screw. This provides an additional safety factor by ensuring the use of a safety shear screw. Again, upon firing of the linear actuator, the fork body 204 can release under the action of an applied force to the fork body 204 as well as the force of gravity.

The water activated circuitry is incorporated by reference from U.S. Pat. No. 5,857,246 dated Jan. 12, 1999 and U.S. Pat. No. 6,099,136 dated Aug. 8, 2000. The UWARS system 100 circuit is an improved circuit exhibiting increased Electromagnetic Static Discharge (ESD) and Radio Frequency (RF) circuit protection. The circuit is dormant type with no battery draw until totally submerged in water. The circuitry is a capacitor discharge type with bleed resistor to afford inadvertent firing protection from splashing. The circuit draws zero current statically, since with no water across the electronic sensors there is no path for the current to flow from the battery, this insures maximum battery life.

System 100 has a modular configuration in which the components can be configured operate together. All U.S. patents referred to in this application are fully incorporated by reference for all purposes. While the present invention has been described with reference to exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

What is claimed is:

1. A parachute release apparatus, comprising:
   a liquid sensor component moveably coupled to a cam member having a teardrop shaped peripheral surface having a lower end and the cam member including an interior wall extending to an outer wall thereby forming a two opposing cavities;
   a pair of laterally disposed disks configured to abuttingly engage the cam member located between the disks so as to engage the opposing cavities of the cam member;
   a linear actuator pivotally coupled to the lower end of the cam member and the linear actuator configured to moveably engage the cam member responsive to a liquid being sensed by the liquid sensor component; and
   a fork member releasable from the disks in response to rotation of the cam member.

2. The apparatus according to claim 1, wherein the fork member includes upright members having a concaved arcuate portion adapted to engage the disks.

3. The apparatus according to claim 1, wherein the fork member includes a concaved arcuate portion adapted to engage the disks.

4. The apparatus according to claim 1, wherein the liquid sensor component, the cam member and disks are enclosed in a body separate from the fork member.

5. The apparatus according to claim 4, wherein the body includes at least two cavities housing the fork member therein.

\* \* \* \* \*